March 9, 1937. W. LEATHERS Re. 20,286
FILTER AND DIRT DISPOSAL FOR ELECTRIC PUSH BROOMS
Original Filed Sept. 18, 1931
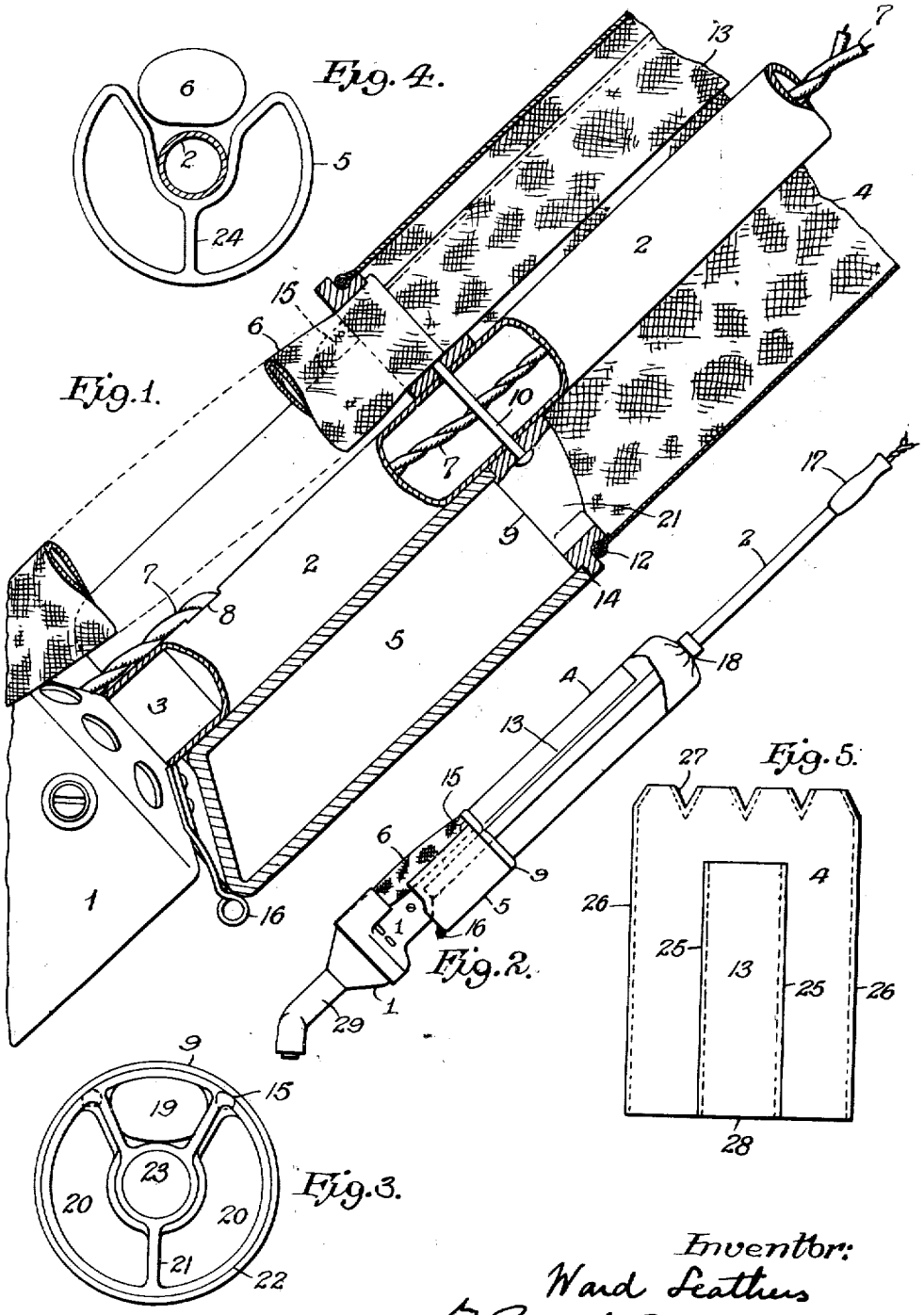
Inventor:
Ward Leathers
by Prindle, Brown & Mann
Attorneys.

Reissued Mar. 9, 1937

Re. 20,286

UNITED STATES PATENT OFFICE 20,286

FILTER AND DIRT DISPOSAL FOR ELECTRIC PUSH BROOMS

Ward Leathers, Haworth, N. J., assignor, by mesne assignments, to Quadrex Corporation, a corporation of Delaware Original No. 1,916,006, dated June 27, 1933, Serial No. 563,508, September 18, 1931. Application for reissue June 22, 1935, Serial No. 28,026

10 Claims. (Cl. 15—16)

This invention relates to an improved suction or vacuum cleaner.

Vacuum cleaners as a rule are bulky devices mostly with the motor-suction-unit supported on wheels on the floor with a handle pivoted to said unit and supporting a combination filter and dirt collector in the form of a voluminous bag.

In order to produce an extremely light weight, cylindrically compact, high-speed, electric suction cleaner for all-service-cleaning, I have invented the herein disclosed suction cleaner having a light weight, cylindrically compact unified structure, including a simplified means for filtering and dirt collection and disposal, and having the handy operativeness of a push broom for movement back and forth over the floor and under and around furniture and other obstructions. The cleaner is thoroughly practical both on smooth floors and on rugs and carpets; and is so compact and slender that it is readily operable under chairs, sofas and the like.

With these and other inherent objects and advantages in view, my invention consists in the construction arrangement and combination of parts hereinafter described and defined in the claims, reference being had to the accompanying drawing which shows, for the purpose of illustrative disclosure a preferred embodiment of my invention, it being understood however that various changes may be made in practice therein within the scope of the claims without digressing from my inventive idea.

In the drawing:

Fig. 1 is a partial view of the aforesaid illustrative suction cleaner, said figure being a combined elevational and longitudinal sectional view of a portion of the motor-suction-unit, the dirt-laden-air duct, filter tube, filter, dirt receptacle, handle and other related parts;

Fig. 2 is a partially broken away side elevation of the entire suction cleaner on a smaller scale of which Fig. 1, as aforesaid, shows only a portion;

Fig. 3 is a plan view of the filter-and-receptacle spider;

Fig. 4 is a diagrammatic transverse section showing the receptacle top in plan view in its relation to the hollow handle and the dirt-laden-air duct;

Fig. 5 shows the fabric pattern from which the filter is made.

Referring to the drawing, the numeral 1 in Fig. 1 is applied to the motor housing in which the axis of the rotor is concentric with the tubular handle 2 which is joined to a boss 3 on the top of said motor housing. The numeral 1 in Fig. 2 represents the entire motor-suction-unit including the operative parts and means for housing these parts. The upper motor bearing is within the boss 3. The illustrated motor-suction-unit is the same motor-suction-unit disclosed and claimed in my U. S. Pat. No. 2,020,121 filed on even date and issued on Nov. 5, 1935. I have discovered that joining the handle to the motor-suction-unit in this manner furnishes the most satisfactory, simple structural relationship for obtaining a rigid push-broom type of device. In order to obtain such relationship, it is most practical to place the tubular filter 4 as shown around the handle. It may be concentric or otherwise if desired. It is also highly desirable as illustrated to keep the entire push-broom assembly as slender, as free from bulk and as nearly cylindrical as possible. In order to accomplish these results, it is desirable to place the dirt receptacle 5 as shown between the top of the motor-suction-unit and the bottom of the filter adjacent the handle 2. It preferably does not completely surround the handle, if the dirt receptacle is to be manually removable. Moreover, this enables the dirt-laden-air duct 6 to be located alongside the handle where it connects together the motor-suction-unit and the filter. This duct 6 may be made of fabric filter material as shown or may be made of sheet-metal if desired. Fabric is the most practical since when the broom is used forcibly against chairs or other obstructions, sheet-metal deforms from impact.

The handle 2 may be fastened to the boss 3 in any desired manner. The electric leads 7 from the motor may be led through a slot 8 in the wall of the tubular handle 2 and the leads themselves brought out of the end of the handle if desired, or brought out in any other suitable manner. A switch also may be provided where desired.

A die-cast spider 9 is riveted to the handle 2 at 10. Connecting webs or spokes 21 in this spider may be located as in Fig. 3; and the spider may be made of any suitable material. The upper end of the tube 6 may be attached to the spider 9 in any suitable manner.

The filter 4 is a cylindrical piece of fabric joined to the spider in the following manner. A wire 12 may be sewn in or inserted in a sewn hem at the base of the filter. The wire is drawn tightly into an annular groove 22 (Fig. 3) in the spider. The ends of the wire may be joined as desired by twisting or by solder and the ends disposed in a neat manner, that is by sliding the fabric over them or by turning the twisted ends into a hole in the spider designed therefor. However, this tubular filter 4 may be joined to the spider 9 peripherally in any other desired manner. The filter 4 has within it a duct 13 formed by the simple method of sewing an extra piece of fabric to the filter fabric 4. The lower end of the duct 13 is secured to the upper end of the tube 6 in any desired manner.

The dirt receptacle 5 may be made of cast metal, sheet metal, or molded material such as phenol resin. It is preferably cylindrical on its outer surface and concentric with the handle. Its upper edge or lip engages a recessed seat 14 in the spider 9. Its back edges come against stops 15 provided on the spider 9. The receptacle 5 may be held in place by any desired means such as springs attached to the sides of the spider 9 or by the spring 16 on the top of the motor-housing. As shown the receptacle may be removed by pulling it out at the bottom. It may be readily pushed back into place, since it is perfectly alined by the handle 2, stops 15, and the spring 16.

Fig. 2 which is a side elevation of the aforesaid electric push-broom or quick use, light-duty vacuum cleaner, shows how the motor-blower-unit 1 is provided with a suction-cleaner nozzle 29 which may be rigid or flexible as desired. The dirt-laden air tube or duct 6 leads into the duct 13 carrying the dirt-laden air over the top thereof. The handle 2 may be provided with a further handle 17 of wood, metal, or molded material. The filter 4 is gathered together in folds or gores for attachment to the handle 2 at 18 where it may be covered with a ferrule for neatness.

Fig. 3 is a plan view of the spider 9 seen from the top. An opening 19 is provided for the attachment of the tube 6. Openings 20 permit the dirt to pass from the filter into the dirt receptacle 5. A spoke 21 in the spider may be provided on the underside of the broom in order to provide greater strength to a light part in case the broom is dropped and this point strikes the floor. The stops 15 are shown on the underside in dotted line. The annular groove is shown at 22 for seating the wired lower-end 12 Fig. 1 of the tubular filter 4. 23 is the opening for receiving the handle.

In Fig. 4 the top or mouth of the dirt receptacle 5 is shown in diagram. If this receptacle is made of molded material, a dividing wall 24 adds great resistance to breakage and since it is in alinement with the spider spoke 21 Fig. 3, it offers no obstruction to the falling dirt. It should be noted that the receptacle 5 is incompletely annular so as to be laterally removable from the handle 2 and the re-entrant angled or notched side of the receptacle straddles the handle and provides a space alongside the handle to receive or house the dirt-laden-air tube 6.

Fig. 5 shows diagrammatically the fabric pattern for making the filter 4. The attachment piece of fabric 13 is sewn along two sides 25 to the filter pattern. The outer sides 26 of the filter pattern are sewn together with 13 temporarily on the outside. The gores 27 are sewn in and the filter turned, thereby providing a neat and practical tubular filter with an integral inlet duct or tube 13. A hem is sewn along the bottom edge 28 through which the wire 12 (Fig. 1) for attachment may be passed.

The mode of operation will be sufficiently apparent from the foregoing description. When the leads 17 are connected to a suitable electric current source, the rotor of the motor-suction-unit is driven creating suction up through the mouth-piece 29 supposed to be resting on the floor or surface to be cleaned. The dirt-laden air thus sucked up into the mouth-piece is then blown by the motor-suction-unit through the duct or tube 6 and the connected tube 13 into the upper end of the filter 4. The excess air passes outwardly through the porous fabric and the separated dirt settles to the lower end of the filter and drops into the dirt receptacle 5 whence it is periodically removed in the illustrative device by detaching and dumping the dirt receptacle. It will be seen that the device is cylindrically compact and slender and is as handy as a push broom to operate and that the other heretofore specified objects and advantages inhere therein by virtue of its construction.

What I claim is:

1. In a suction cleaner, an exposed motor-suction-unit, a handle rigidly attached thereto, a spider surrounding said handle, a filter joined to the upper side of said spider and in communication with the discharge outlet of the motor-suction-unit, and a dirt receptacle which communicates with said filter and is located between the lower side of said spider and the upper end of the motor-suction-unit.

2. In a suction cleaner, an exposed motor-suction unit, a handle rigidly attached thereto, a spider surrounding said handle, a filter joined to the upper side of said spider and in communication with the discharge outlet of the motor-suction-unit, a manually removable dirt receptacle which communicates with said filter and is located between the lower side of said spider and the upper end of the motor-suction-unit and partially surrounds said handle.

3. In a suction cleaner, an exposed motor-suction-unit, a handle rigidly attached thereto, a spider substantially concentric with and rigidly attached to said handle, a fabric filter surrounding and substantially concentric with said handle and joined to the upper side of said spider, said filter being in communication with the discharge outlet of the motor-suction-unit, and a manually removable dirt receptacle communicating with said filter and located between said spider and the upper end of the motor-suction-unit substantially concentric with and partially surrounding said handle.

4. In a suction cleaner, an exposed motor-suction-unit, a handle rigidly attached thereto in such manner that the motor axis and handle axis are substantially coincidental, a spider supported on said handle and concentric therewith, a filter joined to the upper side of said spider, a dirt receptacle partially surrounding said handle communicating with said filter and located between the underside of said spider and the upper end of the motor-suction-unit, and an air duct disposed on the unsurrounded portion of said handle adjacent to said receptacle and establishing communication between the discharge outlet of the motor-suction-unit and the filter.

5. In a suction-cleaner, a motor-suction-unit, a handle rigidly attached thereto, a spider surrounding said handle, a filter joined to the upper side of said spider, a dirt receptacle which communicates with said filter and is fitted to the lower side of said spider, a duct-connection from the discharge outlet of the motor-suction-unit through the spider to the filter, and a duct within the filter communicating with said duct-connection and delivering into the upper end of said filter, said duct-connection and said ducts both having substantially the same diameter.

6. In a suction cleaner, a motor-suction-unit, a handle rigidly attached thereto, a spider surrounding said handle, a filter joined to the upper side of said spider, said filter being in communication with the discharge outlet of the motor-suction-unit, a dirt receptacle which communicates with said filter and is fitted to the lower side of said spider, the handle being tubular and said motor-suction-unit having its electrical cord passing down through said tubular handle and thence passing out of the handle adjacent said unit for connection with the motor thereof.

7. In a suction cleaner, an exposed motor-suction-unit, a handle rigidly attached thereto in such manner that the motor axis and the handle axis are substantially coincidental, a spider substantially concentrically attached to said handle, a filter supported at the upper side of said spider, a dirt receptacle partially surrounding said handle between the underside of the spider and the upper end of the suction-unit, duct-connections respectively between the motor-suction-unit and the filter, and between the filter and the dirt receptacle, the spider being suitably formed with openings through which said duct connections are made.

8. In a suction cleaner, a motor suction unit comprising operative parts and housing means therefor, the upper and lower ends of said housing being at the ends of the axis of rotation of the operative parts, a suction-cleaner mouthpiece on the lower end of the motor suction housing, a dirt receptacle located over the upper end of the motor suction housing, a tubular filter located over the dirt receptacle with its lower end in communication with said receptacle, a duct delivering the dirt-laden air from the motor suction unit to the tubular filter and supporting means which is rigidly connected with said housing and which supports the dirt receptacle and the filter in their aforesaid operative relations.

9. In a suction-cleaner, a motor-suction-unit comprising operative parts and housing means therefor, the upper and lower ends of said housing being at the ends of the axis of rotation of the operative parts, a suction-cleaner mouth-piece on the lower end of the motor-suction housing, a dirt receptacle having its bottom located over the upper end of the motor-suction housing, a tubular filter located over the dirt receptacle with its lower end in communication with the mouth of said receptacle, a duct delivering the dirt-laden air from the motor-suction-unit to the tubular filter, a rod-like member rigid with the motor-suction-housing extending upwardly from said housing through the tubular filter by way of its lower end and extending out through its top, where it forms an exposed handle for manipulating the cleaner, the filter and dirt receptacle being supported about said rod-like member in their aforesaid relationships, the dirt receptacle only partially surrounding the rod-like member and being laterally removable therefrom to dump its contents.

10. In a suction-cleaner, a motor-suction-unit comprising operative parts and housing means therefor, the upper and lower ends of said housing being at the ends of the axis of rotation of the operative parts, a suction-cleaner mouthpiece on the lower end of the motor-suction housing, a dirt receptacle having its bottom located over the upper end of the motor-suction housing, a tubular filter located over the dirt receptacle with its lower end in communication with the mouth of said receptacle, a duct delivering the dirt-laden air from the motor-suction-unit to the tubular filter, a rod-like member rigid with the motor-suction-housing extending upwardly from said housing through the tubular filter by way of its lower end and extending out through its top, where it forms an exposed handle for manipulating the cleaner, the filter and dirt receptacle being supported about said rod-like member in their aforesaid relationships, the dirt receptacle only partially surrounding the rod-like member and being laterally removable therefrom to dump its contents, the aforesaid duct being a tube extending along the rod-like member where the latter is not surrounded by the dirt receptacle.

WARD LEATHERS.

CERTIFICATE OF CORRECTION.

Reissue No. 20,286. March 9, 1937.

WARD LEATHERS.

It is hereby certified that error appears in the printed specification of the above numbered patent requiring correction as follows: Page 3, first column, line 4, claim 5, for the word "ducts" read duct; and that the said Letters Patent should be read with this correction therein that the same may conform to the record of the case in the Patent Office.

Signed and sealed this 20th day of April, A. D. 1937.

(Seal)

Henry Van Arsdale
Acting Commissioner of Patents.